(12) United States Patent
Kung

(10) Patent No.: US 6,697,860 B1
(45) Date of Patent: Feb. 24, 2004

(54) SYSTEM AND METHOD FOR LINKING WEB SITES

(75) Inventor: Tien Mei Kung, Sheung Wan (HK)

(73) Assignee: Viagold Direct Network Limited, Causeway (HK)

( * ) Notice: Subject to any disclaimer, the term of this patent is extended or adjusted under 35 U.S.C. 154(b) by 632 days.

(21) Appl. No.: 09/649,235

(22) Filed: Aug. 28, 2000

(51) Int. Cl.[7] .............................................. G06F 15/16
(52) U.S. Cl. ...................................................... 709/225
(58) Field of Search ............................... 709/223, 227, 709/230, 225

(56) References Cited

U.S. PATENT DOCUMENTS

| | | | | |
|---|---|---|---|---|
| 6,016,504 A | * | 1/2000 | Arnold et al. ............... | 709/200 |
| 6,029,203 A | * | 2/2000 | Bhatia et al. ................ | 709/244 |
| 6,529,706 B1 | * | 3/2003 | Mitchell ..................... | 455/12.1 |
| 6,600,736 B1 | * | 7/2003 | Ball et al. ................... | 370/352 |
| 6,628,644 B1 | * | 9/2003 | Nelson et al. .............. | 370/352 |
| 6,640,302 B1 | * | 10/2003 | Subramaniam et al. ..... | 713/169 |

* cited by examiner

Primary Examiner—David Y. Eng
(74) Attorney, Agent, or Firm—Mikio Ishimaru

(57) ABSTRACT

A method and system for linking web sites is provided for the use of connecting a client computer with a web site in the World Wide Web (WWW). The method allows a user to make a request for linking a web site with his/her client computer by inputting a web site address in the form of telephone number, in the browser of the client computer or a homepage provided by the system for linking web sites. The system for linking web sites is then activated responsive to the linking request made by the user to perform a search based on the input web site address in the web site address-IP address database of the system for linking web sites, of which the web site address is composed of country code, area code and telephone number. The client computer thus can be linked to the desired web site if a web site address is found corresponding to the input one; and the user is advised to re-input a web site address if there is no web site address stored in the database similar to the input one.

22 Claims, 5 Drawing Sheets

FIG. 4
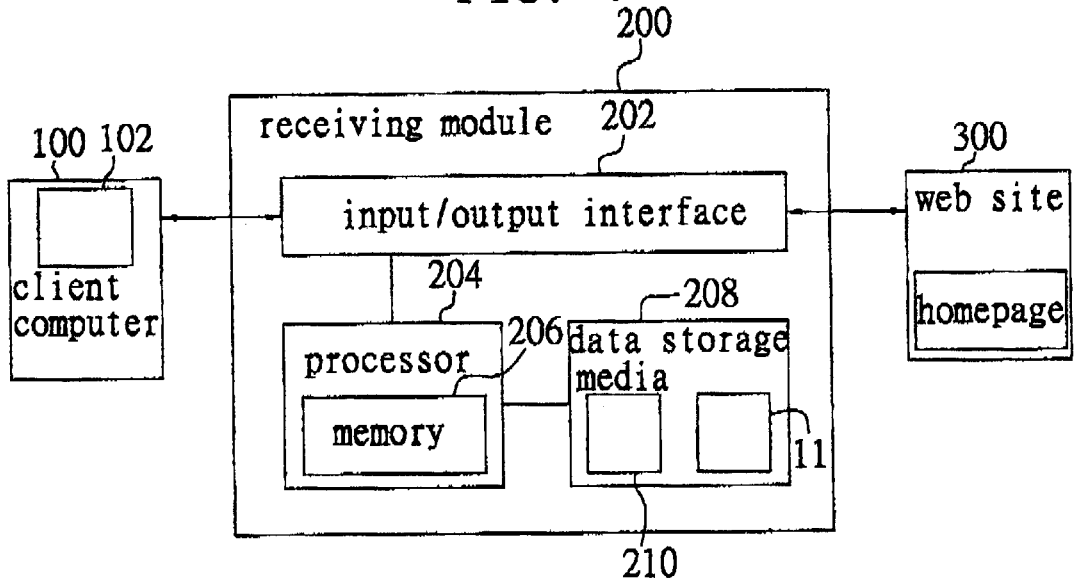
FIG. 5
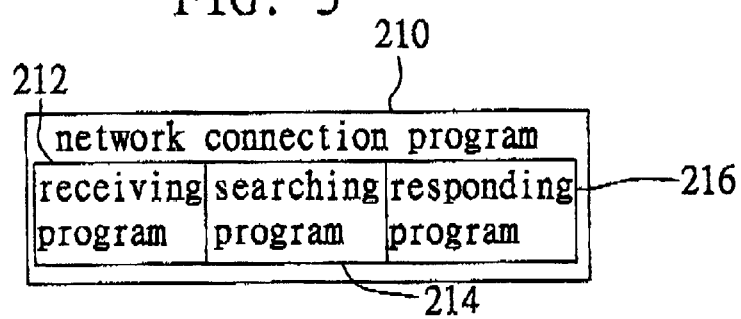
FIG. 6
Enter the channel code for
connection:

FIG. 8

| Channel codes of web sites | web site address | IP address |
|---|---|---|
| 1 | YAHOO | 216.32.74.51 |
| 2 | AOL | 205.188.146.23 |
| 3 | MSN | 207.46.185.39 |
| 4 | amazon | 208.216.181.15 |
| 5 | INTEL | 192.102.198.160 |
| ⋮ | ⋮ | ⋮ |
| 100 | HiNet | 168.95.1.83 |
| ⋮ | ⋮ | ⋮ | ively to a method and a system for
SYSTEM AND METHOD FOR LINKING WEB SITES

1. FIELD OF THE INVENTION

The present invention relates to a method and a system for linking web sites, and more particularly to a method and a system for linking web sites which allows a user to link a client computer with a web site in World Wide Web by inputting a web site address in the browser of the client computer.

2. BACKGROUND OF THE INVENTION

In the world of Internet, every node is assigned with a unique IP address according to the TCP/IP protocol. Likewise, a web site in World Wide Web has its own unique IP address. However, these IP addresses are expressed in numbers and not easy to memorize. Therefore the web site addresses to be used are always denoted by a string of English letter. For example, the web site, www.hinet.net, is in Taiwan popular for those who use Internet often, while its IP address, 168.95.1.83, is barely familiar to people.

With reference to FIG. 1, a conventional way of linking web sites is illustrated. First, a client computer 100 and a server mainframe 200 is connected through network connection 150, allowing a user to send a request to the server for web site connection. In general, this is done by entering the address of the web site 300 in the input URL box on the screen of the browser 102 in the client computer 100, or by clicking a hyperlink for the web site 300 on the same browser 102. The server then inquires the Domain Name System (DNS) for the IP address of the web site 300 according the text in the input URL box or the hyperlink. The DNS replies the IP address of the web site 300 and the server connects the web site 300 according the replied address. The homepage 302 of the web site 300 then displays on the browser 102.

For example, a user enters www.hinet.net in the input URL box of his or her browser if he or she wants to connect HiNet. The browser inquires DNS about www.hinet.net and DNS replies its IP address, 168.95.1.83. The user then can see the homepage of HiNet on his or her browser.

In the net architecture of FIG. 1, the network connection 150 is not restricted to wired network. It can be wireless network, too. Similarly, the client computer device 100 is not restricted to a personal computer (PC), notebook (NB) or palm-sized computer, either. It can be a carry-on device, such as a set top box, other similar information appliance (IA) or personal digital assistant (PDA) or any other communication device capable for Internet, such as a WAP cellular phone set. However, for the sake of easy carry, there is only a simple keypad accompanied with the equipment of set top box, PDA, or WAP cellular phone set. Therefore, the traditional way of net connection is not appropriate for these kinds of equipment due to the difficulty of entering text web addresses.

In addition, text web address is getting lengthy for newly registered web sites to avoid duplicate names with registered web sites, making worse the condition of using text web addresses.

In fact, there is always some kind of meanings with a text web address. Therefore, it is inevitable for some text web addresses to be the same as or similar to other test web addresses. As we can see, there are indeed some ones who registers in some brand names belonging to famous companies for illegal profit. As a result, the traditional net connection of using text web addresses is hard to authenticate and administrate.

In addition to the difficulty of authentication and administration, the traditional net connection of using text web addresses needs extra memory space for saving data, such as the names of people, companies, groups, addresses, telephone numbers, and IP addresses.

In addition to text, there are multimedia data of voice and image in today's Internet. Therefore, there are more and more people using Internet. However, the IP addresses are still basically English in current net connection method and system, which is not convenient for non-English or illiterate people.

SUMMARY OF THE INVENTION

The main object of present invention is to provide with a method and a system of Linking web sites, which are applicable for the Internet devices with simple keypads, such as a set top box, personal digital assistant (PDA), or a WAP cellular phone set.

In accordance with one aspect of the invention, the IP addresses are easy to authenticate and administrate in the method and system of Linking web sites.

In accordance with one aspect of the invention, there is no need of extra memory space for extra data in the method and system of linking web sites.

In accordance with one aspect of the invention, the method and system of Linking web sites are also easy to use for non-English or illiterate people.

A method for linking web sites, which is used for connecting a client computer with a desired web site in World Wide Web via a system for linking web sites including a channel code-IP address database, of which each channel code is assigned to a web site address having a corresponding IP address stored in the database, comprising the steps of: (1) inputting by a user a channel code in the form of digital number in the client computer for making a request for web site linking through the system for linking web sites; (2) having the system for linking web sites perform a search based on the input channel code in the database, if there is no channel code stored in the database found to be matched with the input one, then going to step (3); and if there is a channel code found to be matched with the input one, then converting the web site address found in the database into its corresponding IP address and going to step (4); (3) sending a message indicating the failure of the channel code search by the system for linking web sites to the client computer, for advising the user to re-input another channel code and then going to step (1); and (4) connecting the web site corresponding to the IP address obtained from the step (2) to the client computer to thereby send the homepage of the connected web site to the client computer. In accordance with one aspect of the invention, the system for linking web sites consists of a system for linking web sites that is used for connecting a client computer with a web site in World Wide Web, which comprises: a database, which contains IP addresses and their corresponding records of channel codes assigned to corresponding web site addresses; a receiving module, for accepting connection request from users at client computer; a searching module, for searching whether there is a channel code in the database found to be matched with the input channel code; and a responding module, for sending messages to the client computer according to the search results from the searching module; when there is no matched channel code, a message indicating the failure of the channel code search is sent to the client computer and when there is a matched channel code, the matched channel code is converted into its corresponding IP address and then a web site corresponding to the IP address is connected to the client computer by the responding module.

The coding method for the country codes and area codes for the channel code mentioned above is not strictly defined. However, it is better to code them following the international telephone switch system. Accordingly, not only the client devices with keypads, such as personal computers (PCs), notebooks (NBs) or palm-sized computers, but also the client devices with simple numeric keypads, such as set top boxes, personal digital assistants and WAP cellular phone sets, can connect Internet and browse web sites as easily as dialing telephone numbers.

In accordance with one aspect of the invention, the System for linking web sites can be embedded in the computer devices of PCs, NBs or palm-sized computers, or in computer servers. They can also be integrated as a peripheral device for connecting other computer devices or servers. Some of the composites of the connection of the present invention can also be embedded in the computer devices while the rest of the composites are installed in the computer devices that connect the former computer devices. Therefore, the arrangement of the System for linking web sites of the present invention is not strictly defined. Its arrangement is adjustable depending on its applications.

BRIEF DESCRIPTION OF DRAWINGS

The above and other objects, features, and advantages of the present invention will become apparent from the following description when taken in conjunction with the accompanying drawings which illustrate preferred embodiments of the present invention by way of examples.

FIG. 4 is the third embodiment of block diagram according to the System for linking web sites of the present invention;

FIG. 5 is the content of block diagram of the Linking web sites program of the third embodiment;

FIG. 6 is the display of the homepage supported by the receiving program in the third embodiment;

FIG. 8 is the data table of the database used for the demonstration of the method and system of Linking web sites of the present invention.

DETAILED DESCRIPTION OF PREFERRED EMBODIMENTS

First Embodiment

Figure 1:
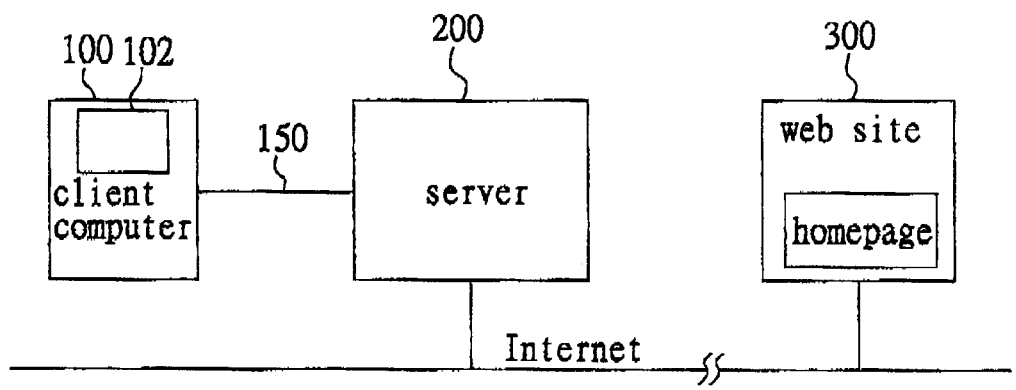
FIG. 1 is the network architecture of the traditional method of linking web sites.
Figure 2:
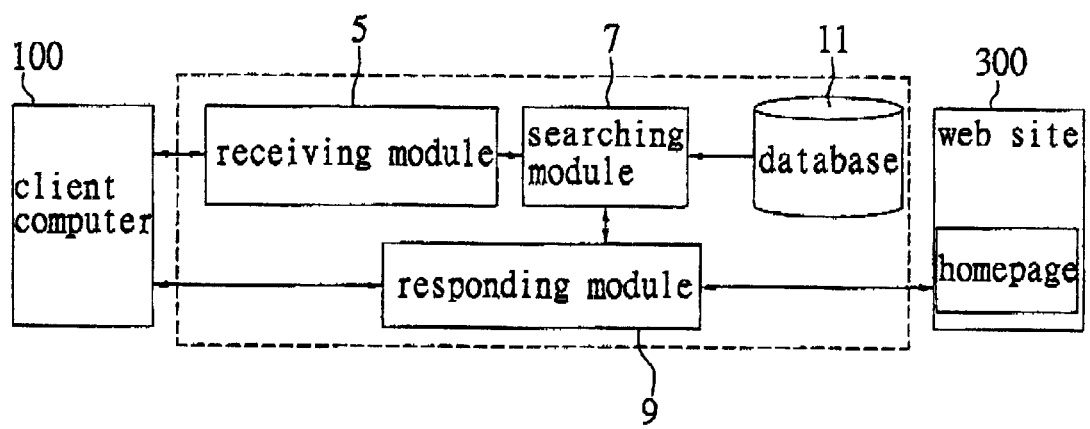
FIG. 2 is the first embodiment of block diagram according to the System for linking web sites of the present invention.

FIG. 2 is the first embodiment of block diagram according to the System for linking web sites of the present invention. As shown in the figure, the System for linking web sites (enclosed in dashed lines) is located between the client computer device 100 and a web site 3 of the World Wide Web. The System for linking web sites consists of a receiving module 5, a searching module 7, a responding module 9 and a database 11. After connecting the client computer device 100, the receiving module 5 accepts the connection request of IP address from the client computer device 100. The searching module 7 searches the database 11 for the related data of the requested IP address and responding module 9 makes the client computer device 100 connect the web site 3 or replies the reason of "unable to connect" to the client computer device, depending on the search result of the searching module 7.

The database 11 consists of IP addresses and channel code that are based on the country codes, area codes and telephone numbers of the registers for the IP addresses. The searching module 7 searches matched or partly matched telephonized web addressed in the database 11 for the request.

If the country codes and area codes of the international telephone switch system are used in the channel code of the System for linking web sites of the present invention, users can connect Internet as easily as dialing telephone numbers by taking the advantage of the current telephone system. For example, the country code of Taiwan is 886 and the area code of Taipei is 2. All the user has to do is enter the number for the requested address in the client computer device 100 for net connection.

Figure 3:
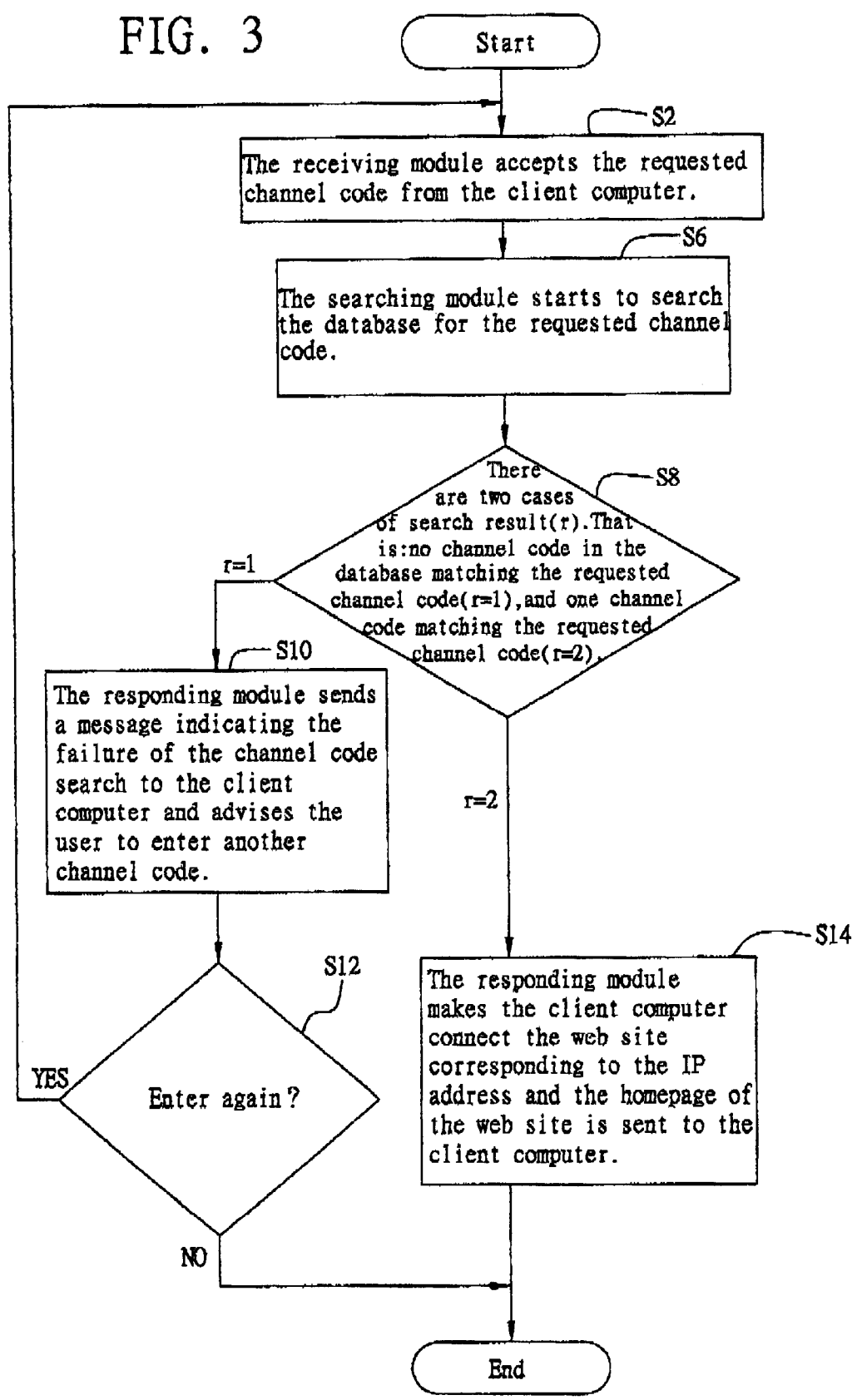
FIG. 3 is the first embodiment of flow chart according to the System for linking web sites of the present invention.

FIG. 3 is the first embodiment of flow chart according to the System for linking web sites of the present invention. With reference to FIGS. 2 and 3, we will explain the method network connection of the present invention.

In the embodiment of the method of Linking web sites, the client computer device 100 connects the System for linking web sites of the present invention. The client computer device 100 requires for a net connection (i.e., entering a requested connection address). The receiving module 5 then accepts the requested connection address from the client computer device 100 (step S2) and starts to search the database 11 for the requested connection address (step S6), where the searched patterns can be part or all of the requested connection address.

That the searched patterns can be part or all of the requested connection address means the country code of the searched telephonized web address may match part or all of that of the requested connection address, the country and area codes of the searched telephonized web address match par or all of those of the requested connection address, or all the searched telephonized web address matches part or all of that of the searched telephonized web address. Therefore, there are three cases of search results (r). That is: no telephonized web address in the database 11 matching the requested connection address (r=1), and only one telephonized web address matching the requested connection address (r=3).

As shown in the step S8 of FIG. 3, the procedure moves to step S10 if r=1 and step S18 if r=3.

In step S10, the responding module 5 sends a message of "The requested IP address is not found" to the client computer devices and asks the user to enter new requested IP address. In step S12, the procedure moves to step S2 if the user replies with positive answer to the request of new requested IP address or the procedures ends if the user replies with negative answer or wishes to stop.

In step S18, the responding module 5 gets a matched IP address provided by the searching module 7 in the step S8 or an IP address chosen by the user in the step S16. The responding module then makes the client computer device 100 connect the web site 3 corresponding to the IP address and the homepage of the web site 3 is sent to the client computer device 100. The procedure then ends.

In accordance with the first embodiment of the method of Linking web sites and its associate system, any Internet device with simple numeric keypad, such as a set top box, personal digital assistant or a WAP cellular phone set, can easily accomplish Linking web sites for just pressing a few numeric keys.

Moreover, to register a new IP address, the register only needs to provide his or her country code, area code, and justifiable telephone number (or assigning a unique number to the one without telephone number) for coding. Therefore the authentication and administration of IP address are simplified, which prevents unnecessary lawsuit.

No extra memory space is needed since there are supposedly memory spaces for registers' contact phone numbers. In addition, people do not feel of extra load to memorize information because the existing telephone number system can be applied.

Using the Linking web sites method and system of the present invention makes connecting Internet as easily as dialing phone numbers even for non-English or illiterate people.

Second Embodiment

FIG. 4 is the second embodiment of block diagram according to the System for linking web sites of the present invention and FIG. 5 is the content of block diagram of the Linking web sites program of the third embodiment. As shown in the figures, the System for linking web sites in the third embodiment is embedded in the server 200 that consists of the input/output interface 202, processor 204, memory 206, data storage media 208, and the database 11 that has the network connection program 210 and the data storage media 208 inside.

The processor 204 executes the network connection program 210 for the jobs of the receiving module, searching module and responding module mentioned before. During the execution of the program, the transmission and reception of data is done via the input/output interface 202. As shown in FIG. 5, the network connection program 210 comprises the receiving program 212, the searching program 214 and the responding program 216. The network connection program 210 of the present embodiment is stored in the data storage media 208. However this should not be constrained. The network connection program 210 can be stored in the read-only memory (such as MASK ROM, EPROM and EEPROM) of the processor 204.

In the above system, the processor 204 can be a microprocessor or CPU. Similarly, the memory 206 can be DRAM, the data storage media 208 can be hard-drive disk, tape or compact disc, and the database 11, as in the previous embodiments, consists of IP addresses and channel code that are based on the country codes, area codes and telephone numbers of the registers for the IP addresses.

In the followings, the functions of the receiving program 212, the searching program 214 and the responding program 216 will be explained and their application to the network connection method in the System for linking web sites of FIG. 4 is demonstrated.

The receiving program 212 is active after the net connection of the client computer device 10000 and the server. It sends the homepage of the System for linking web sites of the present invention to the client computer device 10000. The homepage displays on the browser 102 of the client computer device 10000. Moreover, the receiving program 212 can accept the requested connection address entered by a user in the URL input box and hold it in the memory 206. If there is no browser in the client computer device 10000, the receiving program provides the homepage 104 shown as FIG. 7 for the user to enter the requested connection address in its input box 106.

The searching program retrieves the requested connection address from the memory 206 for analysis. The analysis in the present invention means to separate the telephonized web address of the requested connection address into the parts of country code, area code and phone number. The separated parts are saved in the memory 206. As mentioned before, the coding of the channel code in the present invention follows that of the international telephone switch system. Therefore the detail of separating the channel code is skipped by using the searching program 214 here.

The searching program 214 allows the user to enter the requested connection addresses in varied forms: country code only; country code and fragment of the area code; country code, area code and fragment of the phone number; complete (effective) phone number; incomplete phone number. Therefore, the searched patterns for the country code, area code and phone number are not necessary complete. They can be fragment or incomplete for the search index of the web sites. If any of the country code, area code and phone number of the requested connection address does not exist, the component corresponding to the empty part is saved as NULL in the memory 206.

After analyzing the requested connection address, the searching program searches the requested connection address in the database 11. That is, the searching program retrieves the components of the country code, area code and phone number in the memory 206 and compares them with those of the telephonized web address in the data storage media 208, respectively. The comparison can have the following results (r): r=1, which means there is no telephonized web address in the database 11 matching the requested connection address; r=2, which means there is one telephonized web address exactly matching the requested connection address.

After the operation of search, the searching program 214 will save in the memory 206 the value of r and the exactly matched data when r=2.

Figure 7:
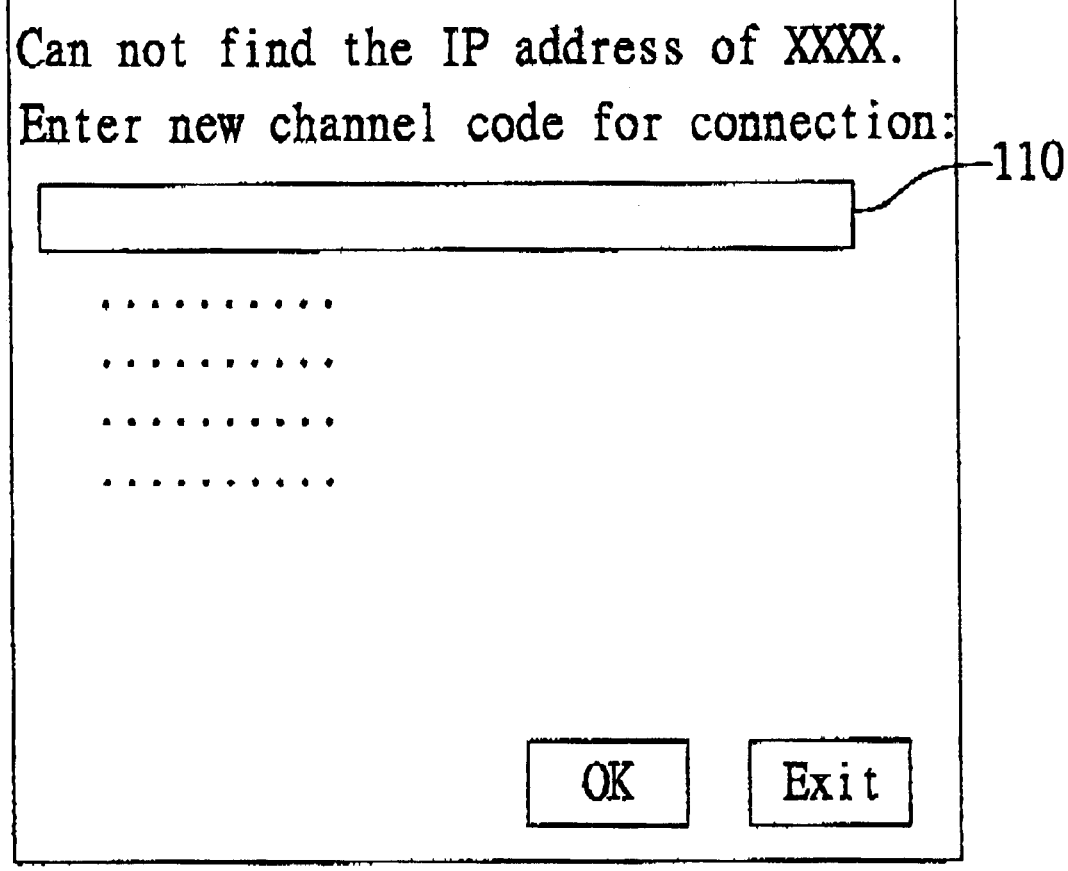
FIG. 7 is the display of the homepage supported by the responding program in the third embodiment.

The responding program 216 reads the value of r from the memory 206. If r=1, it provides with the page 108 as shown in FIG. 7 for not finding the requested connection address and ask the user to enter new requested connection address in the input box 206. If r=2, the responding program 216 reads the exactly matched data in the memory 206 and retrieves its corresponding IP address in the database 11. According to the IP address, the responding program 216 makes the client computer device 10000 connect the web site 300 and the user can communicate with the web site 300 via its homepage.

As shown in FIGS. 7 and 8, web pages 108 and 112 contain two buttons, OK and Exit. The user presses the button of OK after entering new requested connection address or selecting a web site from a list, which orders the program 216 to make connection. The user can press End if he or she does not wish to continue and the all procedure ends.

In addition to the features of the first embodiment, the method and system of Linking web sites of the present embodiment can be applied to the client computer device because the receiving program 212 provides the homepage 104 with input box 106.

The searching program 214 allows fragment or incomplete address for the search index of web sites. Therefore the user can use the Linking web sites method of the present embodiment for easy connection to web sites even if he or she is not familiar with the telephone numbers of the expectedly web sites.

In the embodiments above, the net connection between the client computer device 100 and the System for linking web sites of the present invention is restricted to wired network. It can be wireless network, too. Similarly, the client computer device 100 is not restricted to a personal computer (PC), notebook (NB) or palm-sized computer, either. It can be a carry-on device, such as a set top box, other similar information appliance (IA) or personal digital assistant (PDA), or any other communication device capable for Internet, such as a WAP cellular phone set.

In the second embodiment, the System for linking web sites is embedded in the server 200 that consists of the input/output interface 202, processor 204, memory 206, data storage media 208. However, this shall not be a limitation. The complete System for linking web sites can be embedded in the client computer device or part of the system is in the client computer device and the rest in the server. It can also be integrated into a peripheral device as an external device bridging the client computer device and the server.

In the second embodiment, the receiving program 212, searching program 214 and responding program 216 are executed by the processor 204. However, this shall not be a limitation. That is, they can be embedded in hardware with special feature, such as integrated circuit (IC), and work with the processor 204.

In the followings, we will demonstrate the responses of the present invention to different connection requests with reference to the database 11 of FIG. 10. Suppose the fields in the database 11 are record number, web site name, IP address, country code, area code, phone number and web site description. There are six records in the database.

EXAMPLE 1

If the input channel code is "a01", the result is that there is no channel codes in the records is the same as or similar to "a01" after analysis and comparison. Therefore the responding program 216 provides with the page as shown in FIG. 7 and asks for new requested connection address.

EXAMPLE 2

If the input channel code is "100", the search result is that there is a channel code found to be matched (the "HiNet" web site). Therefore the responding program 216 converts the channel code into its IP address of 168.95.1.83 and then connects the client computer to the HiNet web site for the user to interact with the connected HiNet web site.

EXAMPLE 3

If the requested connection address is "0100" or "00100", the result is that after analysis and comparison there is one matched record D with the country code 886, area code 3 and first two digits, 5 and 7, in the phone number. Therefore the responding program 216 retrieves its IP address 140.31.1.44 and makes the client computer device connect the web site D for the user to communicate with the web site D.

In conclusion, using the method and the system of the Linking web sites of the present invention allows the net connection after search, which is convenient for the users who do not memorize the complete phone numbers of web site. In addition, the present invention can search the web sites based on countries or areas. For example, if the user wants to know what are the web sites in an area of a country, all he or she has to is enter the requested connection address beginning with the codes for the country and the area.

Although certain preferred embodiments of the present invention have been shown and described in detail, it should be understood that various changes and modifications may be made therein without departing from the scope of the appended claims.

What is claimed is:

1. A method for linking web sites, which is used for connecting a client computer with a desired web site in World Wide Web via a system for linking web sites including a channel code-IP address database, of which each channel code is assigned to a web site address having a corresponding IP address stored in the database, comprising the steps of:

(1) inputting by a user a channel code in the form of digital number in the client computer for making a request for web site linking through the system for linking web sites;

(2) having the system for linking web sites perform a search based on the input channel code in the database, if there is no channel code stored in the database found to be matched with the input one, then going to step (3); and if there is a channel code found to be matched with the input one, then converting the web site address found in the database into its corresponding IP address and going to step (4);

(3) sending a message indicating the failure of the channel code search by the system for linking web sites to the client computer, for advising the user to re-input another channel code and then going to step (1); and (4) connecting the web site corresponding to the IP address obtained from the step (2) to the client computer to thereby send the homepage of the connected web site to the client computer.

2. The method for linking web sites according to claim 1, in which the client computer is a computer.

3. The method for linking web sites according to claim 2, in which the computer is provided with a browser on which a user can enter a channel code corresponding to a desired web site for making a request of linking the desired web site through the system for linking web site.

4. The method for linking web sites according to claim 1, in which the system for linking web sites comprises:
   a database;
   a receiving modules for receiving the channel code input by a client computer in the step (1);
   a searching modules for performing a search based on the input channel code in the database in the step (2); and
   a responding modules for sending response according to the search results of step (2) to the client computer responsive to the step (3) or (4).

5. The method for linking web sites according to claim 1, in which the system for linking web sites is built in a server.

6. The method for linking web sites according to claim 1, in which the system for linking web sites built in the client computer capable of connecting a server.

7. The method for linking web sites according to claim 1, in which the system for linking web sites is integrated into a peripheral device as an external device bridging the client computer and the server.

8. The method for linking web sites according to claim 1, in which the system for linking web sites is built partially in the client computer and partially in the server connecting the client computer.

9. A method for linking web sites, that is used for connecting a client computer to a web site in World Wide Web via a system for linking web sites including a receiving module, a searching module, a responding module and a database, wherein the database has channel codes and IP addresses corresponding to the channel codes and each channel code is assigned to a web site address having a corresponding IP address stored in the database, the method comprising steps of:

(1) inputting by a user a channel code of a desired web site in the client computer for being received by the receiving module;

(2) having searching module perform a search in the database based on the input channel code received by the received module and then sending the search result to the responding module;

(3) having the responding module determine according to the search result from the searching module, to go to step (4) if there is no channel code found to be matched with the input one, or go to step (5) if there is a channel code stored in the database found to be matched with the input one and the channel code found to be matched with the input one is converted into its corresponding IP address;

(4) sending a message by the responding module, indicating the failure of the channel code search to the client computer, for advising the user to re-input another channel code and then going to step (1); and (5) connecting the web site corresponding to the IP address obtained from step (3) to the client computer to thereby send the homepage of the connected web site to the client computer, for the user to interactive with the connected web site.

10. The method of Linking web sites according to claim 9, in which the client computer is a computer.

11. The method of Linking web sites according to claim 10, in which the computer is provided with a browser on which a user can enter a channel code corresponding to a desired web site for making a request for linking the desired web site through the system for linking web sites.

12. The method of linking web sites according to claim 9, in which the receiving module, searching module, responding module and database can be built in a server.

13. The method of linking web sites according to claim 9, in which the receiving module, searching module, responding module and database are built in the client computer capable of connecting a server.

14. The method of linking web sites according to claim 9, in which the receiving module, searching module, responding module and database are integrated into a peripheral device as an external device bridging the client computer and the server.

15. The method of linking web sites according to claim 9, in which the receiving module, searching module, responding module and database are built partially in the client computer and partially in the server connecting the client computer.

16. A system for linking web sites that is used for connecting a client computer with a web site in World Wide Web, which comprises:

a database, which contains IP addresses and their corresponding records of channel codes assigned to corresponding web site addresses;

a receiving module, for accepting connection request from users at client computer;

a searching module, for searching whether there is a channel code in the database found to be matched with the input channel code; and a responding module, for sending messages to the client computer according to the search results from the searching module; when there is no matched channel code, a message indicating the failure of the channel code search is sent to the client computer and when there is a matched channel code, the matched channel code is converted into its corresponding IP address and then a web site corresponding to the IP address is connected to the client computer by the responding module.

17. The system according to claim 16, in which the client computer device is a computer.

18. The system for linking web sites according to claim 17, in which the computer is provided with a browser on which a user can enter a channel code corresponding to a desired web site for making a request for linking the desired web site through the system for linking web sites.

19. The system for linking web sites according to claim 16, in which the receiving module, searching module, responding module and database are built in a server.

20. The system for linking web sites according to claim 16, in which the receiving module, searching module, responding module and database are built in the client computer capable of connecting a server.

21. The system for linking web sites according to claim 16, in which the receiving module, searching module, responding module and database is integrated into a peripheral device as an external device bridging the client computer and the server.

22. The system for linking web sites according to claim 16, in which the receiving module, searching module, responding module and database can be built partially in the client computer and the partially in the server connecting the client computer device.

* * * * *